(12) United States Patent
Beamon

(10) Patent No.: US 10,919,598 B1
(45) Date of Patent: Feb. 16, 2021

(54) LEVERAGE PLATES FOR TRANSFORMING BICYCLE PEDAL ARMS INTO FIRST-CLASS LEVERS FOR PROPELLING A BICYCLE

(71) Applicant: Norman Beamon, Tyringham, MA (US)

(72) Inventor: Norman Beamon, Tyringham, MA (US)

( * ) Notice: Subject to any disclaimer, the term of this patent is extended or adjusted under 35 U.S.C. 154(b) by 112 days.

(21) Appl. No.: 16/037,897

(22) Filed: Jul. 17, 2018

(51) Int. Cl.
*B62M 1/26* (2013.01)
*B62M 9/00* (2006.01)

(52) U.S. Cl.
CPC .............. *B62M 1/26* (2013.01); *B62M 9/00* (2013.01)

(58) Field of Classification Search
CPC ................................. B62M 1/26; B62M 9/00
USPC ........................................................ 280/252
See application file for complete search history.

(56) References Cited

U.S. PATENT DOCUMENTS

| 4,889,354 A * | 12/1989 | Wen ..................... B62M 9/08 280/236 |
| 2017/0080281 A1 * | 3/2017 | Hartman ............ A63B 21/4045 |
| 2018/0272184 A1 * | 9/2018 | Vassilaros ................ B62M 3/02 |

* cited by examiner

*Primary Examiner* — Jacob D Knutson
*Assistant Examiner* — Felicia L. Brittman
(74) *Attorney, Agent, or Firm* — Malcolm J. Chisholm, Jr.

(57) ABSTRACT

Each plate (10) includes a plate throughbore (64) secured to an end of a drive axle (52) of a bicycle (16). A pedal arm (72) is secured to an attachment post (68) that extends from the leverage plate (10) between the drive axle (52) and a perimeter edge (70) of the plate (10). Moving a pedal (82) on the pedal arm (72) downward to move the bicycle (16) in a forward, desired direction of motion (56), causes the pedal arm (72) to contact the drive axle (52). An inner end (74) of the pedal arm (72) moves the pedal arm attachment post (68) and leverage plate (10) around the plate throughbore (64). The drive axle (52) therefore becomes a fulcrum (52) of a first-class lever (88) as the pedal arm (72) is moved downward. The leverage plates (10) may retro-fit to any bicycle (16).

20 Claims, 14 Drawing Sheets

LEVERAGE PLATES FOR TRANSFORMING BICYCLE PEDAL ARMS INTO FIRST-CLASS LEVERS FOR PROPELLING A BICYCLE

TECHNICAL FIELD

This disclosure relates apparatus for bicycles and in particular relates to leverage plates for bicycles that transform pedal arms of the bicycle into first-class levers utilizing fulcrums.

BACKGROUND ART

It is well known that many efforts have been made to improve operating efficiencies of modern-day bicycles. For example, U.S. Pat. No. 6,478,322 that issued on Nov. 12, 2002 to Fujiwara et al. (and that was assigned to the Sony Corporation, of Tokyo Japan) discloses a bicycle propelling mechanism utilizing an "oscillating fulcrum point". The fulcrum point slides within a housing and is mechanically connected to pedals that are oscillated up and down to move the bicycle forward. The pedals do not rotate in a 360 degree circle; the fulcrums oscillate with each pedal stroke; and, the force-transfer crank arms and related connectors are complex, heavy, and subject to wear.

U.S. Pat. No. 7,007,570 issued on Mar. 7, 2006 to Gayoh discloses a complicated "pedal crank mechanism for [a] bicycle", wherein a "second fixed fulcrum shaft of a follower crank" is secured to a rearward portion of a lowered frame tube. The pedals in this disclosure also do not rotate in a circular track and instead "pass between the first and second fixed fulcrum shafts". This disclosure also shows use of a fulcrum in a bicycle. However, the complex follower shafts and cranks disclosed teach a non-traditional bicycle frame; an extremely complicated use of heavy metal components that all move in convoluted paths; that make the components subject to wear; and, that are heavy and costly to manufacture and assemble.

More recently, U.S. Pat. No. 8,955,861 that issued on Feb. 17, 2015 to Rasiah discloses an extraordinarily complex "fulcrum lever pedal bar bicycle" including "[t]wo long fulcrum lever pedal arms" connected to frame pivot points by pivoting connecting arms to a rotating spindle sending rotational force by way of an endless loop chain to a rear wheel. As with the previous disclosure, this Patent involves a radical change in a bicycle frame design and again uses up-and-down pedal strokes, and does not include circular pedal motions.

All of these and known bicycle improvement disclosures that seek to use a fulcrum to produce a mechanical advantage in pedaling a bicycle suffer from similar difficulties. Namely, they are too complex, hence too costly. Additionally, they are subject to wear issues because of so many moving parts. Moreover, all of them include many more and large components that add to an overall weight of the bicycle, which acts to counter any advantage achieved by the complex "fulcrum" mechanisms. Further, all such known disclosures seeking a fulcrum advantage invariably result in typically non-circular, or up-and-down motions of the pedals. Finally, compelling evidence that such bicycles have not achieved meaningful improvements in enhancing efficiencies of operating bicycles is shown by the fact that no bicycle seeking to use a fulcrum to enhance riding efficiency has achieved popular use among bicycle riders. Virtually all popular bicycles, including recumbent bicycles, utilize a traditional, light-weight main gear sprocket (typically with multiple gear sizes) rotated by circular motions of pedals on pedal arms extending out from a drive axle passing through the main gear sprocket, with an endless loop chain transferring rotational force from the main gear sprocket to a drive gear at a center of a drive wheel, which is typically a rear wheel.

Accordingly, there is a need for an improved apparatus for bicycles that provides a substantial mechanical advantage when pedaling the bicycle, and that also overcomes deficiencies of the known art.

SUMMARY OF THE DISCLOSURE

The disclosure includes a leverage plate, or more typically a pair of leverage plates that are configured to be secured to opposed ends of a drive axle of a bicycle. Each leverage plate includes a plate throughbore dimensioned to be secured to either of the opposed ends of the drive axle. Each plate also includes a pedal arm attachment post secured to and protruding from an outer surface of the leverage plate. The pedal arm attachment post is positioned between the plate throughbore and a perimeter edge of the leverage plate, so that the pedal arm attachment post is not concentric with a rotational axis of the drive axle. Each leverage plate also includes a counterclockwise stop post that is secured to and extends away from the leverage plate. The counterclockwise stop post is positioned on the leverage plate closer to the perimeter edge of the leverage plate than the pedal arm attachment post. A lower end of a pedal arm is secured to the pedal arm attachment post and a pedal is secured to an opposed outer end of the pedal arm. The pedal arm is positioned between the counterclockwise stop post and the drive axle. The counterclockwise stop post is positioned to stop rotation of the pedal arm about the pedal arm attachment post in a counterclockwise direction beyond the counterclockwise stop post.

Therefore, whenever the pedal moves from about a twelve o'clock position above the pedal arm attachment post to about a twelve o'clock position above the plate throughbore, the pedal arm moves from adjacent the counterclockwise stop post to adjacent the drive axle extending from the plate throughbore. (For purposes herein, the word "about" is to mean plus or minus ten percent.) This configuration transforms the drive axle into a fulcrum of a pedal arm first-class lever thereby providing a mechanical advantage to any force being applied by a rider of the bicycle downward to the pedal. The force transfers from the pedal to the pedal arm, to the drive-axle fulcrum, and to the pedal arm attachment post to thereby facilitate rotation of the leverage plate and the drive axle secured to the leverage plate. The leverage plate, or more typically a pair of leverage plates, may be retro-fit to a main gear sprocket and to opposed ends of a bicycle drive axle of any standard bicycle. Therefore, the present leverage plate is extraordinarily valuable to a wide variety of bicyclists.

For purposes herein, a "first-class lever" is defined to mean a lever having a fulcrum in the middle of the lever and wherein an effort or force is applied to one side of the fulcrum, and a resulting resistance or load is applied to an opposed side of the fulcrum. Traditional first-class levers include a playground "see-saw", scissors, a crow bar, etc. The above described pedal arm, drive axle, and pedal arm attachment post is also a first-class lever. An amount of mechanical advantage achieved by a first-class lever can be calculated as a ratio of input force to output force including ratios of distances from the fulcrum to where the input and output forces are applied to the lever, as is well known.

More specifically the disclosure includes a leverage plate, or more typically a pair of leverage plates that are configured to be secured a bicycle. The bicycle includes a frame, a steering mechanism attached to the frame, a seat attached to the frame for seating a rider. The bicycle also includes a front wheel rotatably secured to the frame and to the steering mechanism on a front end of the frame, a drive wheel rotatably secured to a rear end of the frame. The drive wheel has a drive gear sprocket for rotating the drive wheel as a driving wheel. A main gear sprocket is secured to a gear side of the frame about midway between the front and rear wheels. A drive-transmitting endless-loop chain is secured between the main gear sprocket and the drive gear sprocket.

For purposes herein a view-direction axis and a revolving motion of the drive axle and of the bicycle described herein and in the appended drawings are defined as follows. The view-directional axis for a reader of this disclosure is aligned and oriented in a view-direction that first passes through the main gear sprocket, then passes through the gear side of the frame, and then passes through and away from a non-gear side of the frame. Similarly, for a reader of this disclosure, a revolving motion around the view-directional axis in a clockwise direction of the described leverage plates, the main gear sprocket and the drive axle, is oriented so that the clockwise revolving of the leverage plates, the main gear sprocket and the drive axle moves the bicycle in a desired forward moving direction.

Each leverage plate includes an outer planar surface and an opposed frame-side planar surface, and the planar surfaces define a plate throughbore passing through the opposed surfaces of the leverage plate. The drive axle is dimensioned to be secured to the plate throughbore and to pass through and be secured to an axle throughbore of the main gear sprocket. A pedal arm attachment post is secured to and protrudes from the outer planar surface of the leverage plate in a direction away from the bicycle frame. The pedal arm attachment post is positioned between the plate throughbore and a perimeter edge of the leverage plate. Each leverage plate also includes a pedal arm having an inner end and an opposed outer end. The inner end of the pedal arm is secured to the pedal arm attachment post so that the outer end of the pedal arm extends in a direction about parallel to the outer planar surface of the leverage plate and extends beyond the perimeter edge of the leverage plate. The pedal arm attachment post secures the pedal arm against removal from the attachment post. The pedal arm also includes an inward side and an opposed outward side, wherein the inward side is closer to the plate throughbore than the outward side of the pedal arm. A pedal is rotatably secured to the outer end of the pedal arm so that rotation of the pedal through a 360 degree rotation moves the pedal arm, the leverage plate, the drive axle and the main gear sprocket through a 360 degree rotation around the plate throughbore.

A counterclockwise stop post is secured to and extends away from the leverage plate in a direction parallel to the pedal arm attachment post and is positioned on the leverage plate closer to the perimeter edge of the leverage plate than the pedal arm attachment post. The counterclockwise stop post is also positioned closer to the outer end of the pedal arm than the pedal arm attachment post to thereby stop rotation of the pedal arm around the pedal arm attachment post in a counterclockwise direction beyond the counterclockwise stop post.

The pedal arm attachment post, the counterclockwise stop post and the pedal arm are cooperatively configured so that the pedal arm is secured to pivot about the pedal arm attachment post between the counterclockwise stop post and the drive axle passing through the plate throughbore. Therefore, whenever the pedal moves from about a twelve o'clock position above the pedal arm attachment post to about a twelve o'clock position above the plate throughbore, wherein "above" is a direction opposed to a direction of a pull of gravity, the pedal arm moves from adjacent the counterclockwise stop post to adjacent the drive axle extending from the plate throughbore to transform the drive axle into a fulcrum of a pedal arm first-class lever.

The pedal arm first-class lever provides a mechanical advantage to any force being applied by a rider of the bicycle. The force is applied by the bicycle rider in the direction of the pull of gravity to the pedal, to the pedal arm, to the drive-axle fulcrum, and to the pedal attachment post. This substantially facilitates rotation of the leverage plate, the drive axle and the main gear sprocket while the pedal rotates in the clockwise direction from the about twelve o'clock position above the plate throughbore to the about six o'clock position below the plate throughbore.

In an additional and alternative embodiment, the pair of leverage plates that are secured to opposed ends of the drive axle include a gear-side leverage plate and a non-gear-side leverage plate. The gear-side leverage plate includes a gear-side protective plate that overlies and is secured to the outer planar surface of the gear-side leverage plate. The non-gear-side leverage plate includes a non-gear-side protective plate that overlies and is secured to the outer planar surface of the non-gear-side leverage plate. Additionally, pedal arms of the leverage plates are secured between the protective plates and the leverage plates.

In another and alternative embodiment, each of the pair of leverage plates secured to opposed ends of the drive axle include a shock absorber that extends between the inward side of the pedal arm and a first clockwise stop post. The first clockwise stop post is secured to and extends away from the leverage plate in a direction parallel to the pedal arm attachment post and is also positioned on the leverage plate between the drive axle and the perimeter edge of the leverage plate so that whenever the inward side of the pedal arm contacts the drive axle, the inward side of the pedal arm also contacts the first clockwise stop post. Therefore, both the drive axle and the first clockwise stop post serve to stop the pedal arm from rotating beyond the first clockwise stop post in a clockwise direction. The shock absorber adds a resistance force to movement of the pedal arm from adjacent the counterclockwise stop post to being adjacent the drive axle and the first clockwise stop post. Also, the shock absorber adds a rebound force to move the pedal arm in a counterclockwise direction from adjacent the drive axle to adjacent the counterclockwise stop post as the pedal arm of the bicycle rotates in a clockwise direction from the about a six o'clock position below the plate throughbore to the about a twelve o'clock position above the pedal arm attachment post.

In another and alternative embodiment, the shock absorber further comprises flexible material that is positioned adjacent the inward side of the pedal arm, that is also positioned around the first clockwise stop post, and that is also positioned around a shock absorber anchor post. The shock absorber anchor post is secured to the leverage plate and extends away from the leverage plate in a direction parallel to the pedal arm attachment post. The shock absorber anchor post is also positioned on the leverage plate between a line passing through the drive axle and the first clockwise post and at a position on the leverage plate that is a predetermined distance in a clockwise direction away from the line passing through the drive axle and the first clockwise post.

In another and alternative embodiment, the flexible material is about a one-half inch thick layer of rubber matt extending from adjacent the inward edge of the pedal arm to the shock absorber anchor post whenever the pedal arm is in about the twelve o'clock position above the pedal arm attachment post.

In another and alternative embodiment, the shock absorber is not a flexible material, but is in the form of a mechanical shock absorber that extends between the inward side of the pedal arm and the shock absorber anchor post.

In another and alternative embodiment, each leverage plate includes a second clockwise stop post that extends away from the leverage plate in a direction parallel to the pedal arm attachment post and that is positioned on the leverage plate between the drive axle and the perimeter edge of the leverage plate. A post-catch that is defined at a lower end of the pedal arm contacts the second clockwise stop post whenever the inward side of the pedal arm contacts the drive axle and the first clockwise stop post. Therefore, the second clockwise stop post supports the drive axle and the first clockwise stop post in preventing the pedal arm from moving in a clockwise direction beyond the first and second clockwise stop posts.

In yet another and alternative embodiment, the gear-side leverage plate includes an interface plate secured to the frame-side planar surface of the gear-side leverage plate. The interface plate includes bolt-holes and an interface throughbore configured to secure the interface plate to the frame-side planar surface of the gear-side leverage plate, to surround the drive axle, and to secure the interface plate to the main gear sprocket. This permits the gear-side leverage plate to utilize the interface plate to retro-fit the leverage plate to virtually any main gear sprocket driven bicycle.

In a further and alternative embodiment, each of the leverage plates and each of the protective plates overlying the leverage plates define an arcuate guide slot. Additionally, each of a first pedal arm and a second pedal arm include a guide pin extending away from opposed pedal arm surfaces into the arcuate guide slots. An outer edge of each of the arcuate guide slots is closer to the perimeter edges of the leverage plates than an inner edge of each of the arcuate guide slots. The arcuate guide slots and the guide pins are configured so that, whenever either the first or second pedal arm is adjacent the counterclockwise stop post, the guide pin is adjacent the outer edge of the arcuate guide slot. Also, whenever the pedal arm is adjacent the drive axle, the guide pin is adjacent the inner edge of the arcuate guide slot. Therefore, each guide pin and guide slot cooperate to add support to stopping of movement of the pedal arm in a counterclockwise direction beyond the counterclockwise stop post and the outer edge of the guide pin slot. Additionally, each guide pin and guide slot cooperate to add support to stopping of movement of the pedal arm in a clockwise direction beyond the drive axle, the first clockwise stop post, and the inner edge of the guide pin slot.

In another alternative embodiment, the outward side of the pedal arm defines a post-recess dimensioned to receive and secure the counterclockwise stop post against movement toward and away from the outer end of the pedal arm.

Again, for purposes herein, the word "about" is to mean plus or minus ten percent.

PREFERRED EMBODIMENTS OF THE DISCLOSURE

Figure 1:
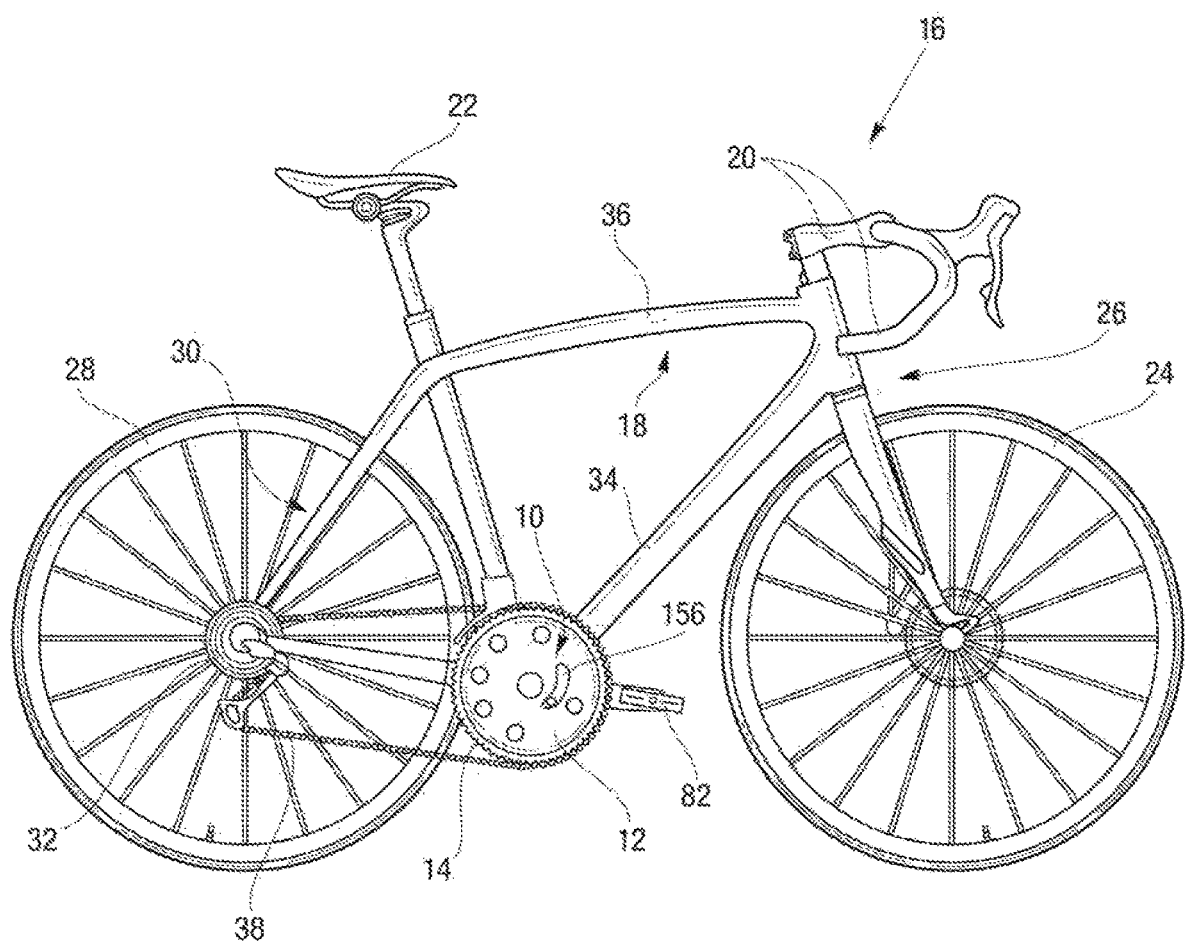
FIG. 1 is a side plan view of a bicycle having a leverage plate constructed in accordance with the present invention, wherein the leverage plate is secured to a main gear sprocket of the bicycle.

Referring to the drawings in detail, a leverage plate constructed in accordance with the present invention is shown in FIGS. 2-9 and is generally designated by the reference numeral 10. FIG. 1 shows a gear-side protective plate 12 that overlies and is secured to the leverage plate 10 (not shown in FIG. 1) that is also secured to a main gear sprocket 14 of a bicycle 16. The bicycle 16 may be any form of gear driven bicycle, including recumbent bicycles, folding bicycles, mountain bicycles, road bicycles, etc. The most common bicycle 16 typically includes a frame 18, a steering mechanism 20 attached to the frame 18, a seat 22 attached to the frame for seating a rider (not shown). The bicycle 16 also includes a front wheel 24 rotatably secured to the frame 18 and to the steering mechanism 20 on a front end 26 of the frame, a drive wheel 28 rotatably secured to a rear end 30 of the frame 18. The drive wheel 28 has a drive gear sprocket 32 for rotating the drive wheel 28 as a driving wheel 28. The main gear sprocket 14 is secured to a gear side 34 of the frame 18 opposed to a non-gear side 36 of the frame 18 and about midway between the front wheel 24 and the drive wheel 28. A drive-transmitting endless-loop chain 38 is secured between the main gear sprocket 14 and the drive gear sprocket 32.

In order to clarify the present description and to effectively describe relative positioning of the many components of the present disclosure shown in the plan views of FIGS. 2-9, a view-directional axis 40 and a revolving motion 50 of a drive axle 52 and of the bicycle 16 described herein and in the appended drawings are defined and shown in FIGS. 13 and 2 as follows. The view-directional axis 40 for a reader of this disclosure is aligned and oriented in a view-direction 40 (shown only in FIG. 13) that first passes through a FIG. 13 protective plate 44, then a FIG. 13 leverage plate 46, then the FIG. 13 main gear sprocket 48, then passes through the gear side 34 of the frame 18, and then passes through and away from the non-gear side 36 of the frame 18. Similarly, for a reader of this disclosure, a revolving motion 50 in a clockwise direction 54 (shown in FIGS. 2-9 and 13) around the view-directional axis 40 (shown in FIG. 13) of the described leverage plates 10, 46, the main gear sprocket 14, 48 and the drive axle 52 (shown only in FIGS. 2-9 and FIGS. 11A and 11B) is oriented to move the bicycle 16 in a desired forward moving direction 56 (shown in FIG. 13).

As shown best in FIGS. 2-9, each leverage plate 10 includes an outer planar surface 60 and an opposed frame-side planar surface 62, and the planar surfaces 60, 62 define a plate throughbore 64 passing through the opposed surfaces 60, 62 of the leverage plate 10. The drive axle 52 is dimensioned to be secured to the plate throughbore 64 and to pass through and be secured to an axle throughbore 66 (shown only in FIG. 12) of the main gear sprocket 14. A pedal arm attachment post 68 is secured to and protrudes from the outer planar surface 60 of the leverage plate 10 in a direction away from the bicycle frame 18. The pedal arm attachment post 68 is positioned between the plate throughbore 64 and a perimeter edge 70 of the leverage plate 10. Each leverage plate 10 also includes a pedal arm 72 having an inner end 74 and an opposed outer end 76. The inner end 74 of the pedal arm 72 is secured to the pedal arm attachment post 68 so that the outer end 76 of the pedal arm 72 extends in a direction about parallel to the outer planar surface 60 of the leverage plate 10 and extends beyond the perimeter edge 70 of the leverage plate 10. The pedal arm attachment post 68 secures the pedal arm 72 against removal from the attachment post 68. The pedal arm 72 also includes an inward side 78 and an opposed outward side 80, wherein the inward side 78 is closer to the plate throughbore 64 than the outward side 80 of the pedal arm 72. A pedal 82 is rotatably secured through a pedal mount 83 to the outer end 76 of the pedal arm 72 so that rotation of the pedal 82 through a 360 degree rotation moves the pedal arm 72, the leverage plate 10, the drive axle 52 and the main gear sprocket 14 through a 360 degree rotation around the plate throughbore 64.

A counterclockwise stop post 84 is secured to and extends away from the leverage plate 10 in a direction parallel to the pedal arm attachment post 68 and is positioned on the leverage plate 10 closer to the perimeter edge 70 of the leverage plate 10 than the pedal arm attachment post 68. The counterclockwise stop post 84 is also positioned closer to the outer end 76 of the pedal arm 72 than the pedal arm attachment post 68 to thereby stop rotation of the pedal arm 72 around the pedal arm attachment post 68 in a counterclockwise direction (as represented by the arrow and associated reference numeral 86 in FIG. 2) beyond the counterclockwise stop post 84.

The pedal arm attachment post 68, the counterclockwise stop post 84 and the pedal arm 72 are cooperatively configured so that the pedal arm 72 is secured to pivot about the pedal arm attachment 68 post between the counterclockwise stop post 84 and the drive axle 52 passing through the plate throughbore 64. Therefore, whenever the pedal 82 moves from about a twelve o'clock position above the pedal arm attachment post 68 to about a twelve o'clock position above the plate throughbore 64, wherein "above" is a direction opposed to a direction of a pull of gravity, the pedal arm 72 moves from adjacent the counterclockwise stop post 84 to adjacent the drive axle 52 extending from the plate throughbore 64 to transform the drive axle 52 into a fulcrum 52 of a pedal arm first-class lever (the components of which are generally designated by the reference numeral 88). Movement of the pedal 82 from adjacent the counterclockwise stop post 84 to adjacent the drive axle 52 is shown in the sequence of FIGS. 2-5A. FIGS. 2-9 also show a spacer bolt 53 that secures the leverage plate 10, as described in more detail below with reference to FIGS. 12 and 13 regarding a plurality of spacer bolts 147.

Figure 3:
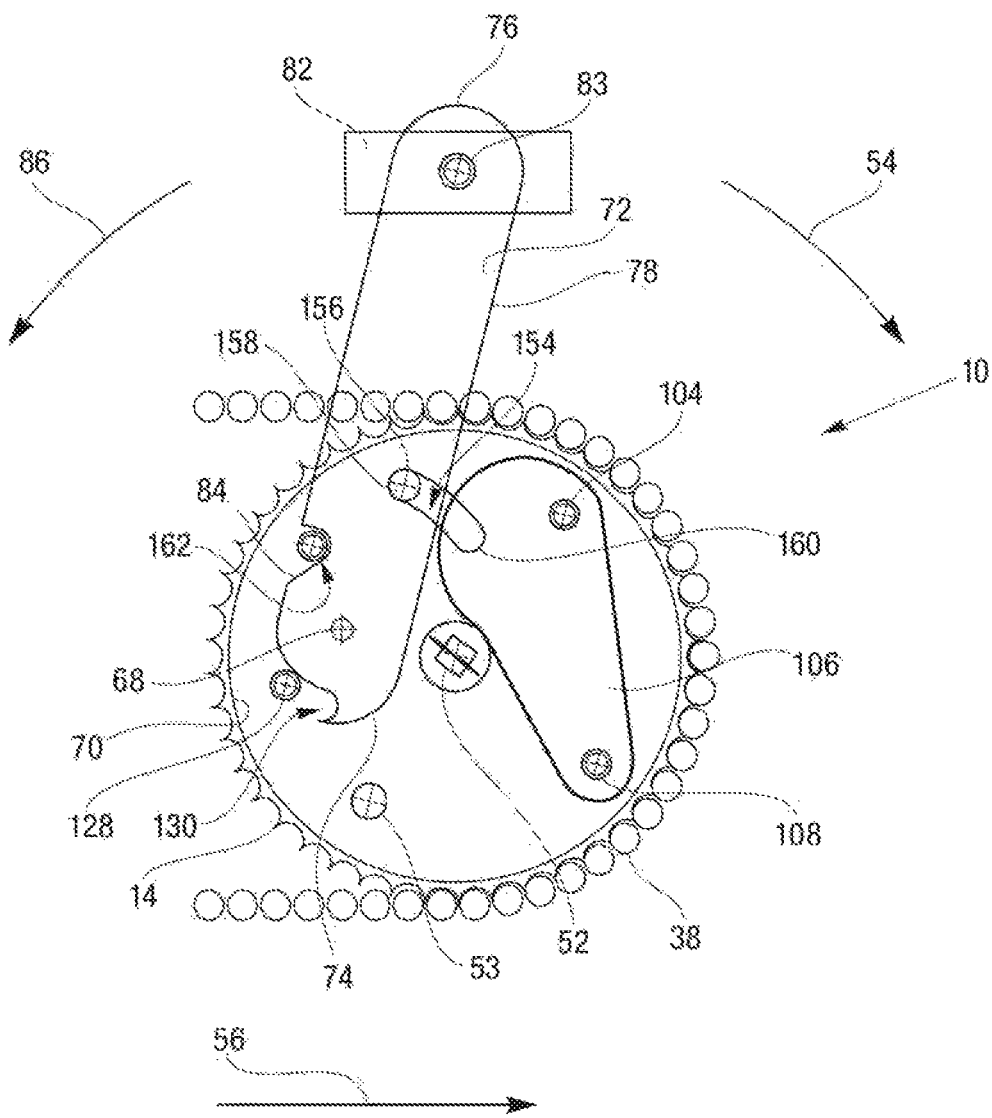
FIG. 3 shows the FIG. 2 leverage plate with the pedal moved from the twelve o'clock position above the pedal arm attachment post to about a twelve o'clock position above a plate throughbore of the leverage plate, and also shows a shock absorber of flexible material extending from a shock absorber anchor post to contact an inner side of the pedal arm.
Figure 7:
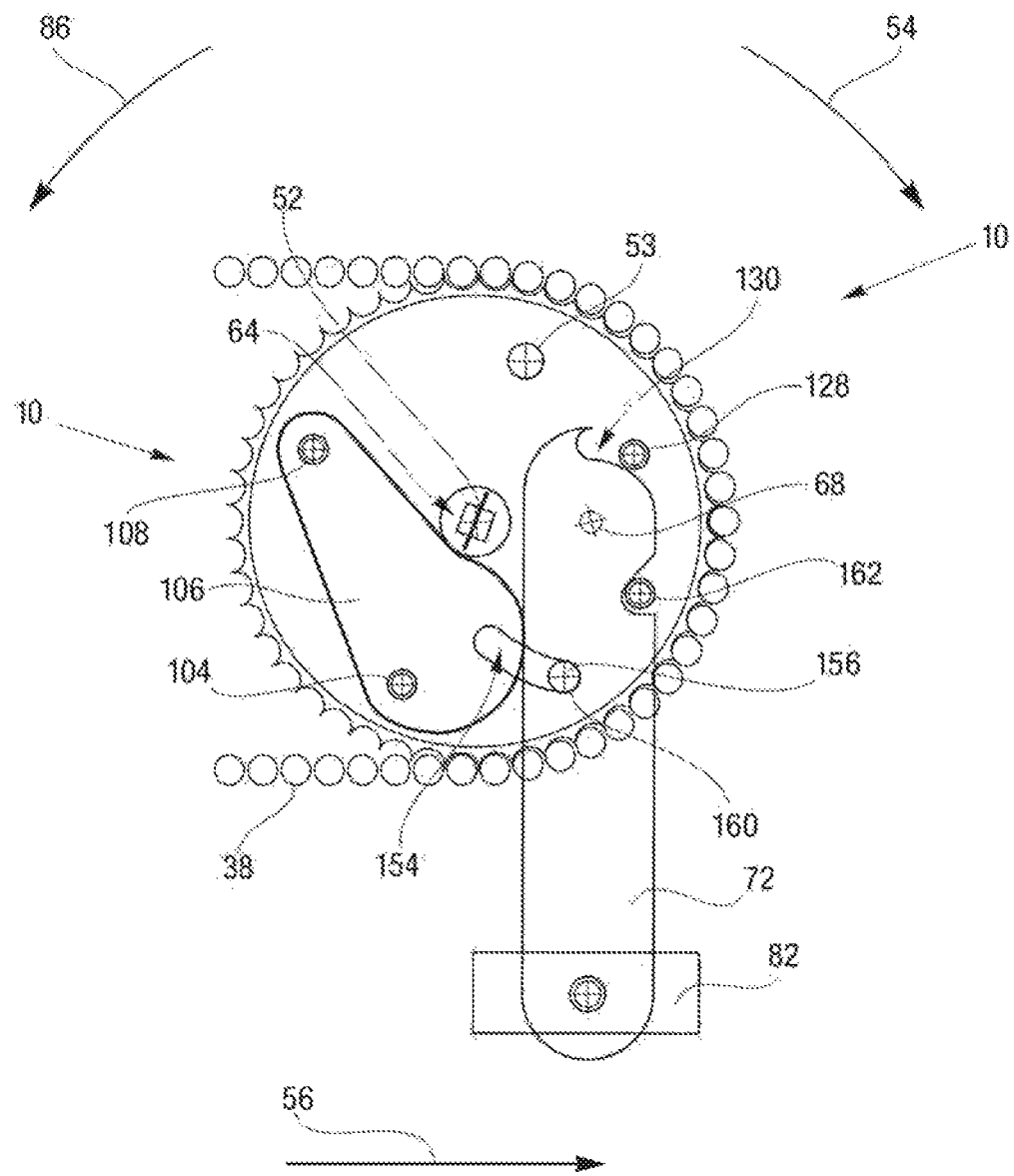
FIG. 7 shows the FIG. 6 leverage plate with the pedal moved to an about six o'clock position below the pedal arm attachment post and shows shock absorber flexible material fully decompressed and exerting a rebound force to keep the pedal arm adjacent a counterclockwise stop post.

The pedal arm first-class lever 88 provides a mechanical advantage to any force being applied by a rider (not shown) of the bicycle 16. A force is applied by the bicycle rider in the direction 90 of the pull of gravity to the pedal 82, to the pedal arm 72, to the drive-axle fulcrum 52, and to the pedal attachment post 68. This substantially facilitates rotation of the leverage plate 10, the drive axle 52 and the main gear sprocket 14 while the pedal 82 rotates in the clockwise direction 54 from the about twelve o'clock position above the plate throughbore 64 (as shown in FIG. 3) to an about six o'clock position below the plate throughbore 64 (as shown in FIG. 7).

Figure 13:
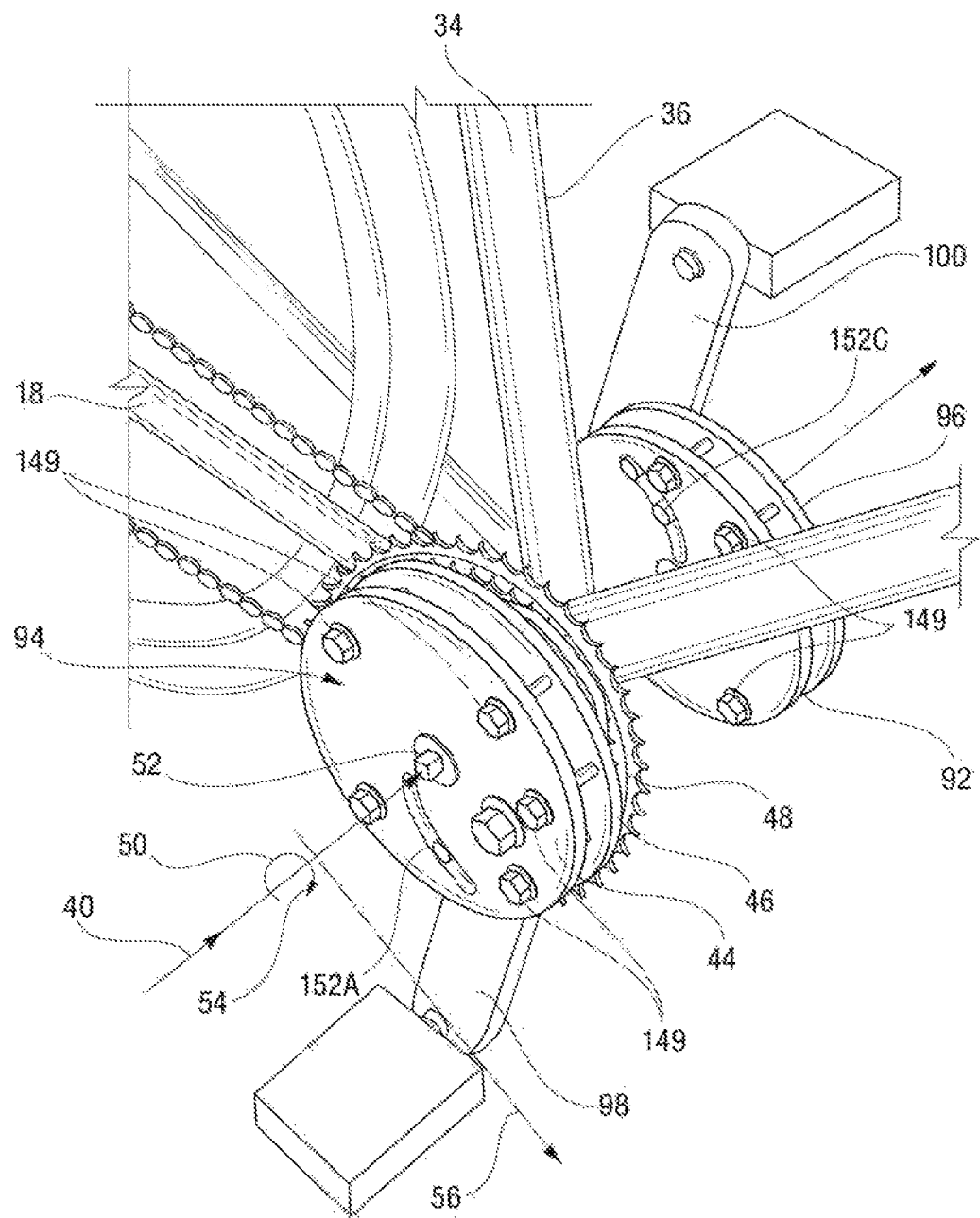
FIG. 13 is a raised perspective view of a first leverage plate with an interface plate secured to a main gear sprocket of a bicycle and a second leverage plate secured to a non-gear side of the bicycle.

In an additional and alternative embodiment, as shown in FIG. 13, a pair of leverage plates are secured to opposed ends of the drive axle 52 and include a gear-side leverage plate 46 and a non-gear-side leverage plate 92. The gear-side leverage plate 46 includes a gear-side protective plate 94 that overlies and is secured to the gear-side leverage plate 46. The non-gear-side leverage plate 92 includes a non-gear-side protective plate 96 that overlies and is secured to the non-gear-side leverage plate 92. Additionally, a first pedal arm 98 is secured between the gear-side leverage 46 and the gear-side protective plate 94, and a second pedal arm 100 is secured between the non-gear-side leverage plate 92 and the non-gear-side protective plate 96.

As shown in FIGS. 2-9 and 11A and 11B, In another and alternative embodiment, each leverage plate 10 may include a shock absorber 102 that extends between the inward side of the pedal arm 78 and a first clockwise stop post 104. The first clockwise stop post 104 is secured to and extends away from the leverage plate 10 in a direction parallel to the pedal arm attachment post 68 and is also positioned on the leverage plate between the drive axle 52 and the perimeter edge 70 of the leverage plate 10 so that whenever the inward side 78 of the pedal arm 72 contacts the drive axle 52 (as shown in FIGS. 5A and 5B, the inward side 78 of the pedal arm 72 also contacts the first clockwise stop post 104. Therefore, both the drive axle 52 and the first clockwise stop post 104 serve to stop the pedal arm 72 from rotating beyond the first clockwise stop post 104 in a clockwise direction 54.

The shock absorber 102 adds a resistance force to movement of the pedal arm 72 from adjacent the counterclockwise stop post 84 to being adjacent the drive axle 52 and the first clockwise stop post 104. Also, the shock absorber 102 adds a rebound force to move the pedal arm 72 in a counterclockwise direction 86 from adjacent the drive axle 52 to adjacent the counterclockwise stop post 84 as the pedal 72 arm of the bicycle 16 rotates in a clockwise direction 54 from the about a six o'clock position below the plate throughbore 64 (as shown in FIG. 7) to the about a twelve o'clock position above the pedal arm attachment post 68 (as shown in FIG. 2).

As shown in FIGS. 4-7, the shock absorber 102 may be in the form of flexible material 106 that is positioned adjacent the inward side 78 of the pedal arm 72, that is also positioned around the first clockwise stop post 104, and that is also positioned around a shock absorber anchor post 108. The shock absorber anchor post 108 is secured to the leverage plate 10 and extends away from the leverage plate in a direction parallel to the pedal arm attachment post 68. The shock absorber anchor post 108 is also positioned on the leverage plate 10 between a line passing through the drive axle 52 and the first clockwise post 104 and at a position on the leverage plate 10 that is a predetermined distance in a clockwise direction away from the line passing through the drive axle 52 and the first clockwise post 104.

Figure 2:
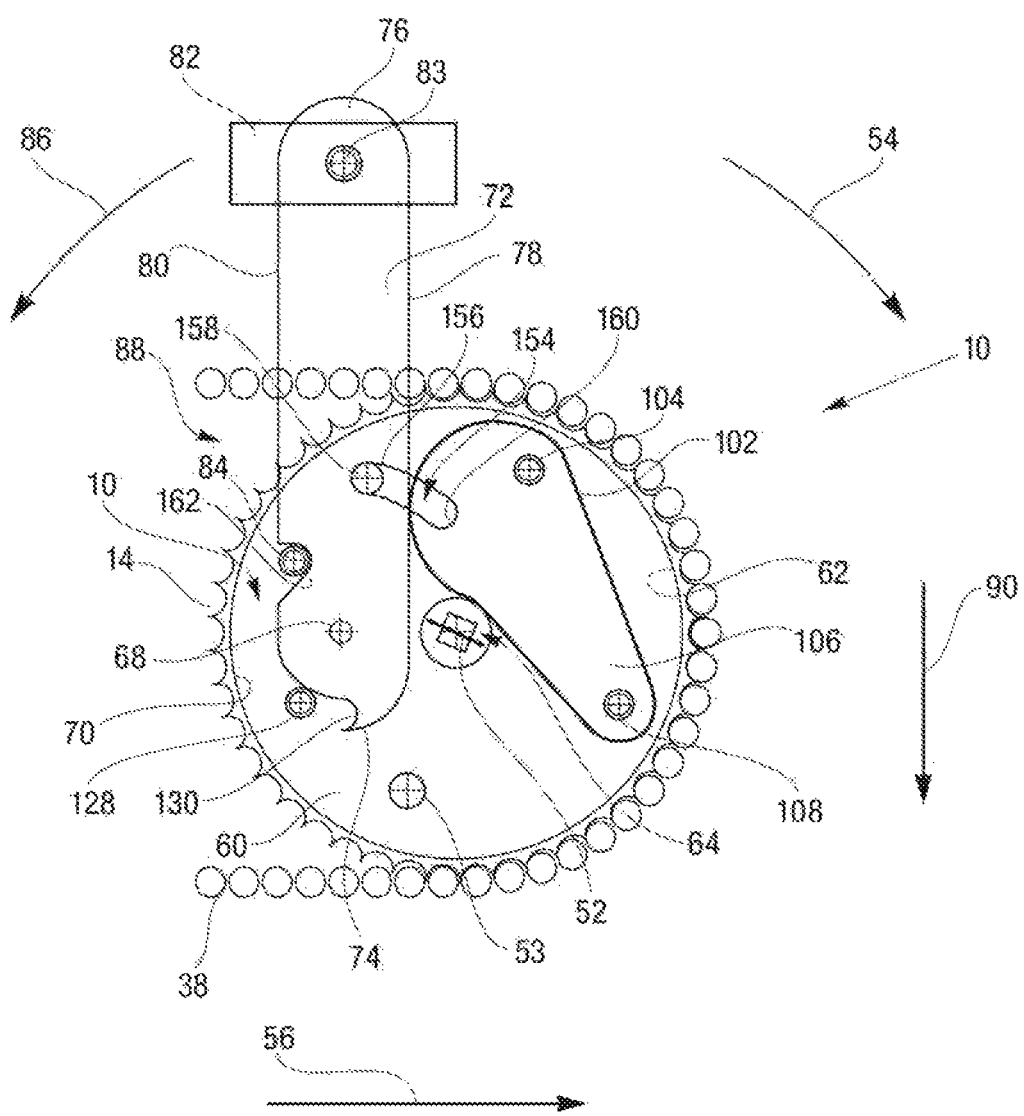
FIG. 2 is a side plan view of a leverage plate constructed in accordance with the present invention, and showing a pedal of the leverage plate in an about twelve o'clock position above a pedal arm attachment post.
Figure 10:
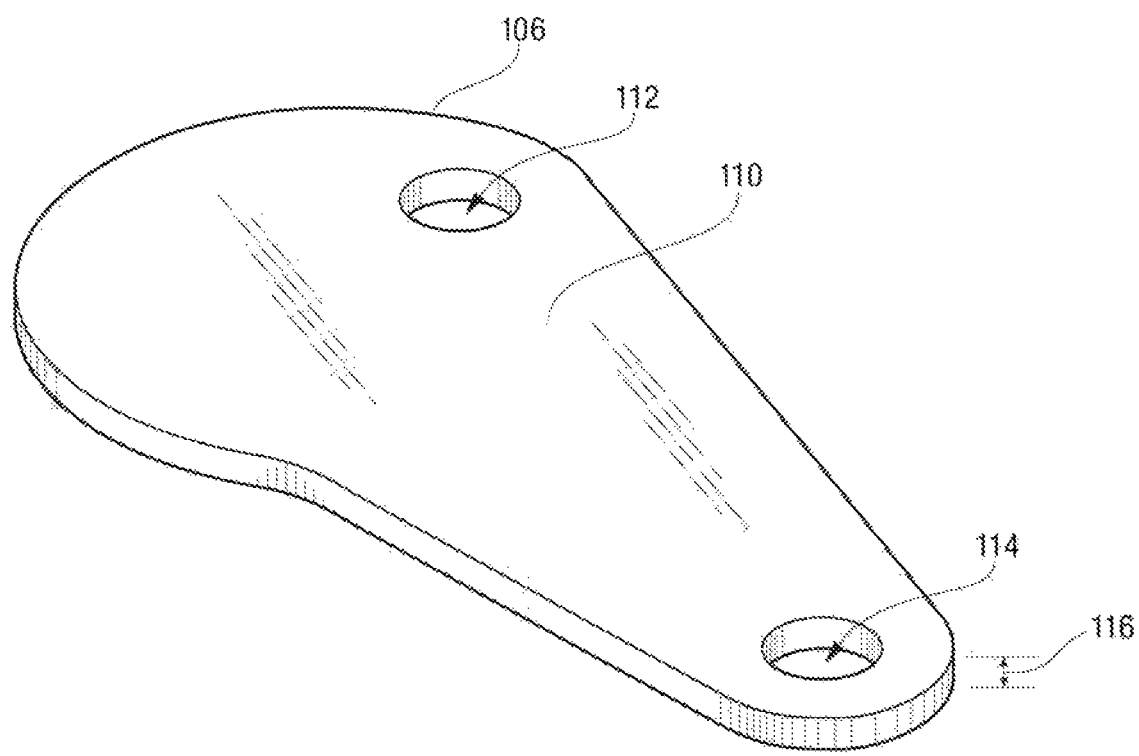
FIG. 10 is a raised perspective view of a shock absorber made of flexible material such as the shock absorber shown in plan views secured within a leverage plate in FIGS. 2-9.

In a particular embodiment as shown in FIG. 10, the flexible material 106 is about a one-half inch thick layer of rubber matt 110 extending from adjacent the inward edge 78 of the pedal arm 72 to the shock absorber anchor post 108 whenever the pedal arm is in about the twelve o'clock position above the pedal arm attachment post 68, as shown in FIG. 2. The one-half inch thick layer of rubber matt 110 may have defined a first matt throughbore 112 dimensioned to encompass the first clockwise stop post 104 and a second matt throughbore 114 dimensioned to encompass the shock absorber anchor 108. The rubber matt 110 flexible material 106 shock absorber 102 throughbores 112, 114 encompass the posts 104, 108 to secure the rubber matt 110 adjacent to the outer planar surface 60 of the leverage plate. In FIG. 10, a thickness dimension 116 is the shortest dimension of the rubber matt 110.

The inventor herein undertook a substantial experimental effort to determine an optimal shock absorber 102 that would slowly absorb the powerful downward thrust of an average bicyclist (not shown) so that a movement of pedal 82 through a power stroke would not result in abrupt slide and metallic stop of the pedal 82 and pedal arm 82. Additionally, abrupt stopping of the pedal arm on the drive axle 52 and the first clockwise stop post 104 would rapidly wear the drive axle 52, the first clockwise stop post 104 and the pedal arm 72. Results of many experiments by the inventor resulted in discovery that an optimal rubber matt 110 is readily available to the public as a standard, one-half inch horse stall matt. Such a matt is typically sold in four foot by four or by eight foot dimensions, but can easily be cut into the shape of the rubber matt of FIG. 10. Such a rubber matt is available under the product name of "PEBBLE SURFACE STALL MATS" made from 100 percent recycled and re-vulcanized rubber from recycled vehicle tires, and is available on the worldwide web at a web site entitled "therubberman.com".

Figure 11A:
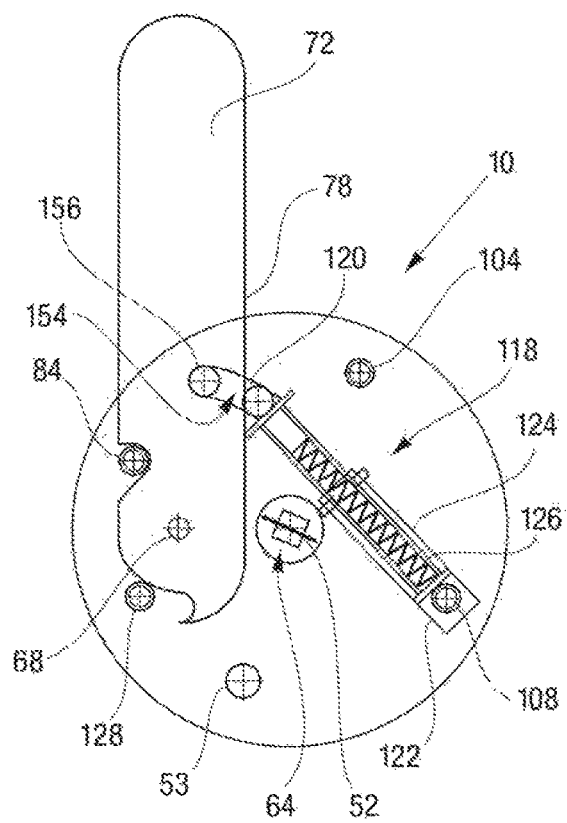
FIG. 11A is a cross-sectional plan view of a mechanical shock absorber secured between an inner edge of a pedal arm and a shock absorber anchor post of a leverage plate, and showing the mechanical shock absorber in a non-compressed configuration.
Figure 11B:
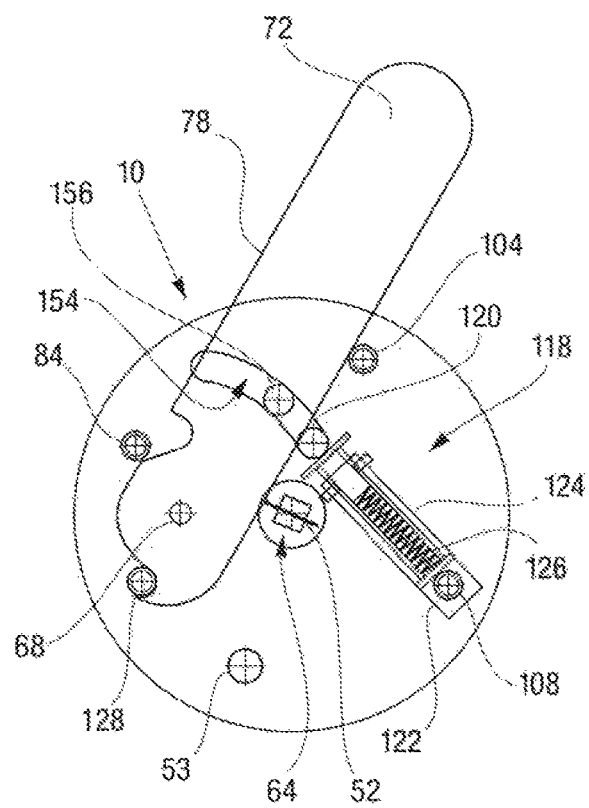
FIG. 11B shows the shock absorber of FIG. 11A in a compressed configuration.

As shown in FIGS. 11A and 11B, the shock absorber 102 is not a flexible material, but is in the form of a mechanical shock absorber 118 that extends between the inward side 78 of the pedal arm and the shock absorber anchor post 108. The mechanical shock absorber may be any mechanical shock absorber known in the art and capable of performing the functions described herein of slowing movement of the pedal arm 72 from the about a twelve o'clock position above the pedal arm attachment post 68 (FIG. 2) and being in contact with the drive axle 52 and the first clockwise stop post 104 (FIG. 5A), such as automobile shock absorbers, shock absorbers for tailgates of automobiles, etc. An exemplary shock absorber shown in FIGS. 11A and 11B includes a forward shock mount 120 configured to secure the shock absorber adjacent the inward edge 78 or the pedal arm 72 and rearward shock receiver 122 configured to secure the shock absorber to the shock absorber anchor post 108. Such an exemplary shock absorber also includes a slide-sleeve 124 extending between the shock absorber mount 120 and the shock absorber rearward shock receiver 122 that houses a shock spring 126 within the slide sleeve 124. The shock spring 126 is configured to be compressed as the pedal arm 72 moves from adjacent the counterclockwise stop post 84 to be adjacent the drive axle 52 and the first clockwise stop post 104, as shown in the sequence of FIGS. 11A and 11B. The mechanical shock absorber 118 may also include standard hydraulic components (not shown) utilized with spring components, as with known mechanical shock absorbers.

As shown in FIGS. 2-9, the leverage plate 10 may also include a second clockwise stop post 128 (seen best in FIG. 3) that is secured to and extends away from the leverage plate 10 in a direction parallel to the pedal arm attachment post 68 and that is positioned on the leverage plate 10 between the drive axle 52 and the perimeter edge 70 of the leverage plate 10. A post-catch 130 (seen best in FIG. 3) that is defined at the inner end 74 of the pedal arm 72 contacts the second clockwise stop post 128 whenever the inward side 78 of the pedal arm 72 contacts the drive axle 52 and the first clockwise stop post 104, as shown in FIGS. 5A and 5B. Therefore, the second clockwise stop post 128 supports the drive axle 52 and the first clockwise stop 104 post in preventing the pedal arm 72 from moving in a clockwise direction 54 beyond the first and second clockwise stop posts 104, 128.

Figure 12:
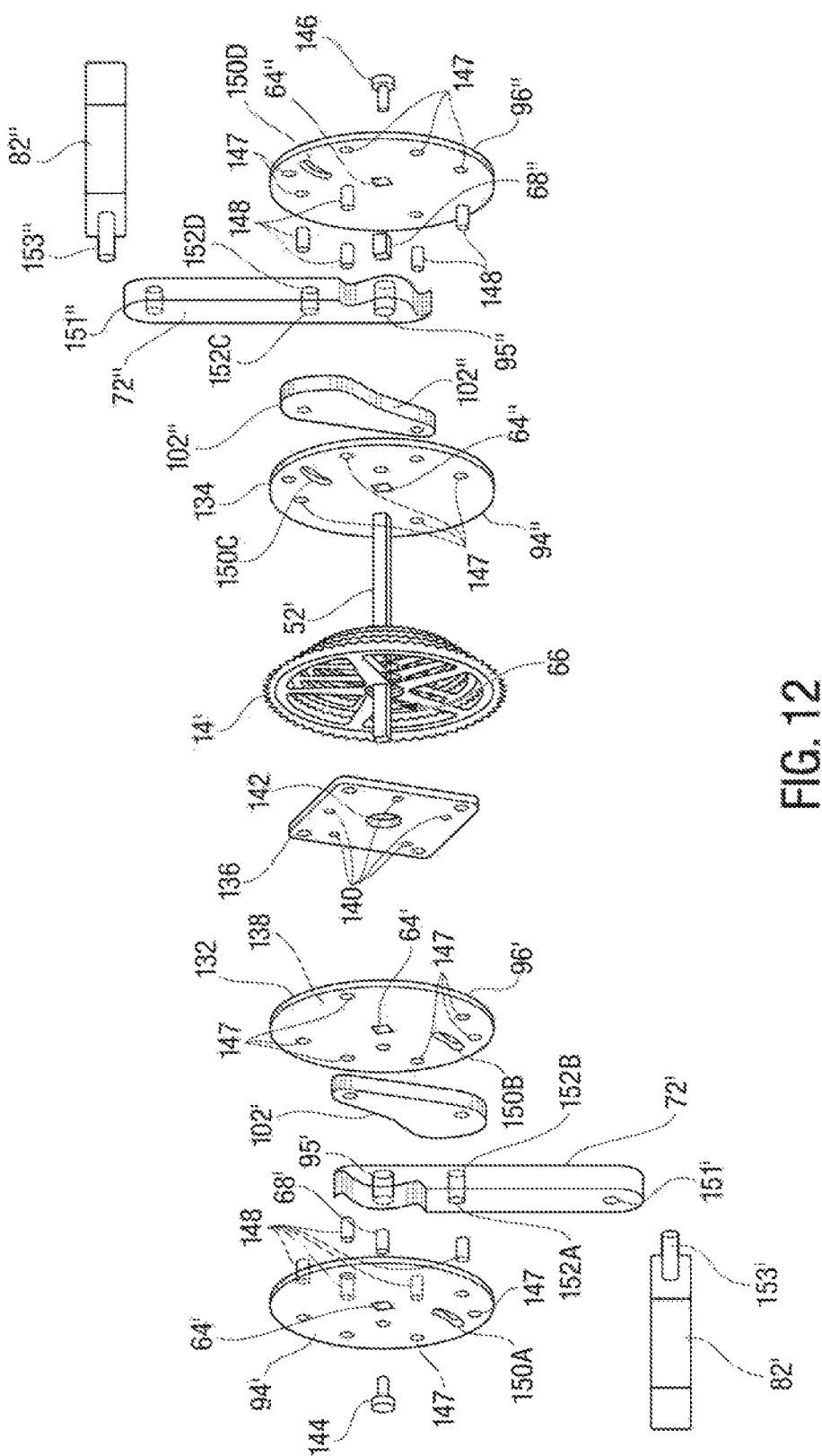
FIG. 12 is an exploded perspective view of a first leverage plate and second a second leverage plate disposed in mirror image association and showing an interface plate between the second exploded leverage plate and a main gear sprocket secured to a bicycle drive axle.

FIG. 12 shows an exploded view of a pair of leverage plates characterized for FIG. 12 as a second gear-side leverage plate 132 and an opposed second non-gear-side leverage plate 134. FIG. 12 also shows an interface plate 136 that may be secured to a frame-side planar surface 138 of the second gear-side leverage plate 132. The interface plate 136 includes bolt holes 140 and an interface throughbore 142 configured to secure the interface plate 136 to the frame-side planar surface 138 of the second gear-side leverage plate 132. When the interface plate 136 is secured to the second gear side leverage plate 132 and to the main gear sprocket 14', an interface throughbore 142 surrounds the drive axle 52'. This permits the second gear-side leverage plate 132 to utilize the interface plate 136 to retro-fit the leverage plate to virtually any main gear sprocket 14' driven bicycle 16. (Components of the second-gear side leverage plate 132 shown in FIG. 12 that are virtually identical to the same components described with respect to FIGS. 2-9 are labelled in FIG. 12 as primes of the virtually identical components shown in FIGS. 2-9. For purposes of efficiency, components of the second-gear side leverage plate 132 shown in FIG. 12 that are virtually identical to the same components described with respect to FIGS. 2-9 are labelled in FIG. 12 as primes of the virtually identical components shown in FIGS. 2-9. For example, the shock absorber 102 of a first gear-side leverage plate 10 shown in FIGS. 2-9 is labelled as 102' in FIG. 12. Components of the second-non-gear side leverage plate 134 shown in FIG. 12 that are virtually identical to the same components described with respect to FIGS. 2-9 are labelled in FIG. 12 as double primes of the virtually identical components shown in FIGS. 2-9. For example, the shock absorber 102 of the first gear-side leverage plate 10 shown in FIGS. 2-9 is labelled as 102" in FIG. 12.)

FIG. 12 also shows a first cap bolt 144 and a second cap bolt 146 that secure the exploded components shown between the cap bolts 144, 146 upon the drive axle 52'. Additionally, FIG. 12 shows a plurality of plate spacers 148 that may receive corresponding spacer bolts (not shown) in various positions to secure the opposed protective plates 94', 96" to their corresponding leverage plates 132, 134 and to secure the FIG. 12 components between the protective plates 94', 96" and the leverage plates 132, 134, as shown in FIG. 13. Also seen in FIG. 12 are pedal arm attachment post bearings 68', 68" located between the pedal arms 72', 72" and the protective plates 94', 96" and also located adjacent petal arm mount throughbores 95', 95" dimensioned to receive the pedal arm attachment post bearings 68', 68" in securing the pedal arms 72', 72" to their corresponding leverage plates 94', 94". FIG. 12 further includes a plurality of bolt holes 147 throughout the plates 94', 94", 132, 134 to receive the spacer bolts (not shown). The FIG. 12 pedal arms 72', 72" also show pedal arm throughbores 151', 152" dimensioned to receive pedal mount struts 153', 153" extending from the pedals 82', 82" to secure the pedals 82', 82" to the pedal arms 72', 72". Also shown in FIG. 12 are plate throughbores 64', 64", as described with respect to FIG. 2.

FIG. 12 also shows that each of the leverage plates 132, 134 and each of the protective plates 96', 96" overlying the leverage plates 132, 134 define an arcuate guide slot 150A, 150B, 150C and 150D and corresponding guide pins 152A, 152B, 152C and 152D extending from opposed surfaces of the pedal arms 72', 72". When the leverage plates 132, 134 and protective plates 94", 96" of FIG. 12 are assembled on a bicycle 16, as shown in FIG. 13, it can be seen in FIG. 13 that a first guide pin 152A extends through the FIG. 13 gear-side protective plate 94, and that a third guide pin 152C extends through a FIG. 1.3 non-gear-side leverage plate 92.

Figure 4:
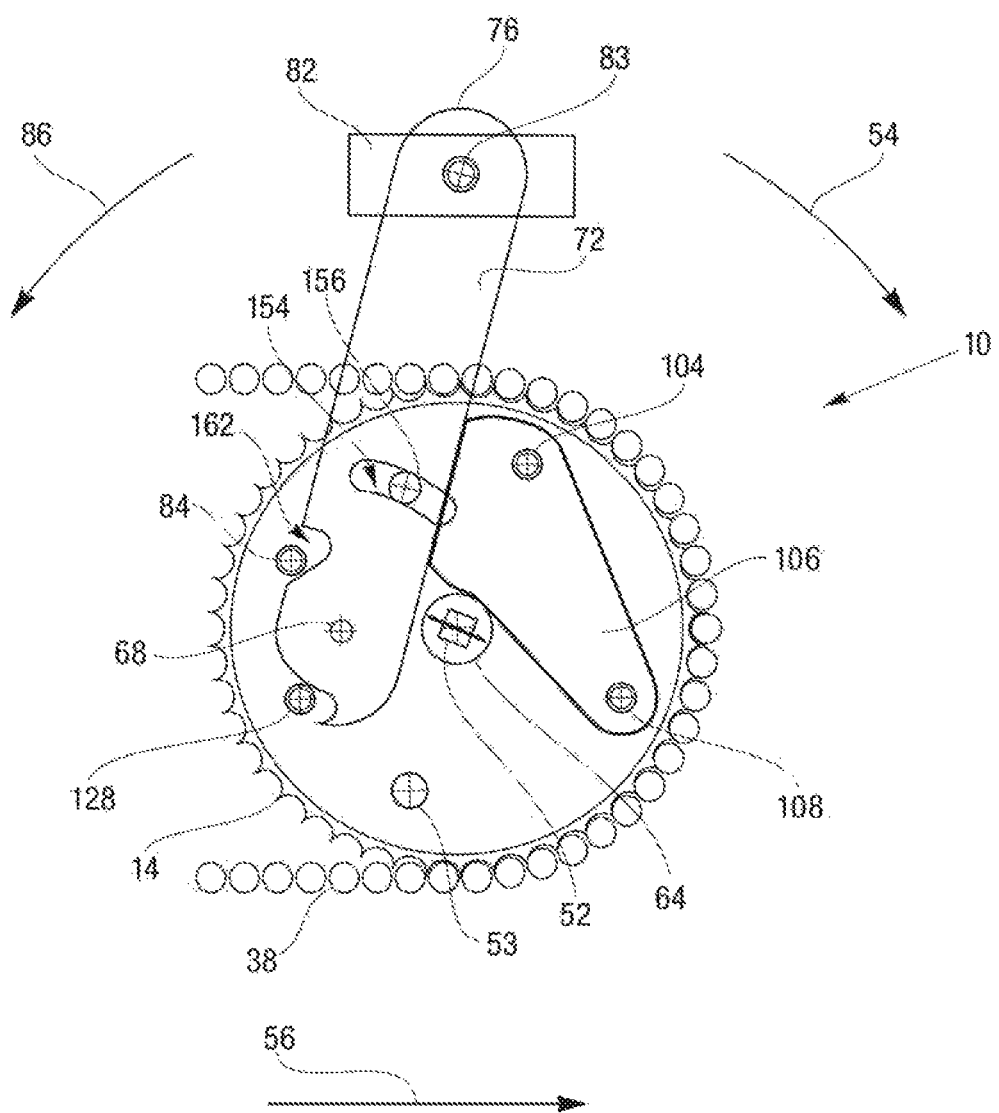
FIG. 4 shows the FIG. 3 leverage plate with the pedal moved from the twelve o'clock position above the plate throughbore to an about one o'clock position above the plate throughbore, and shows the shock absorber flexible material partially compressed.
Figure 5A:
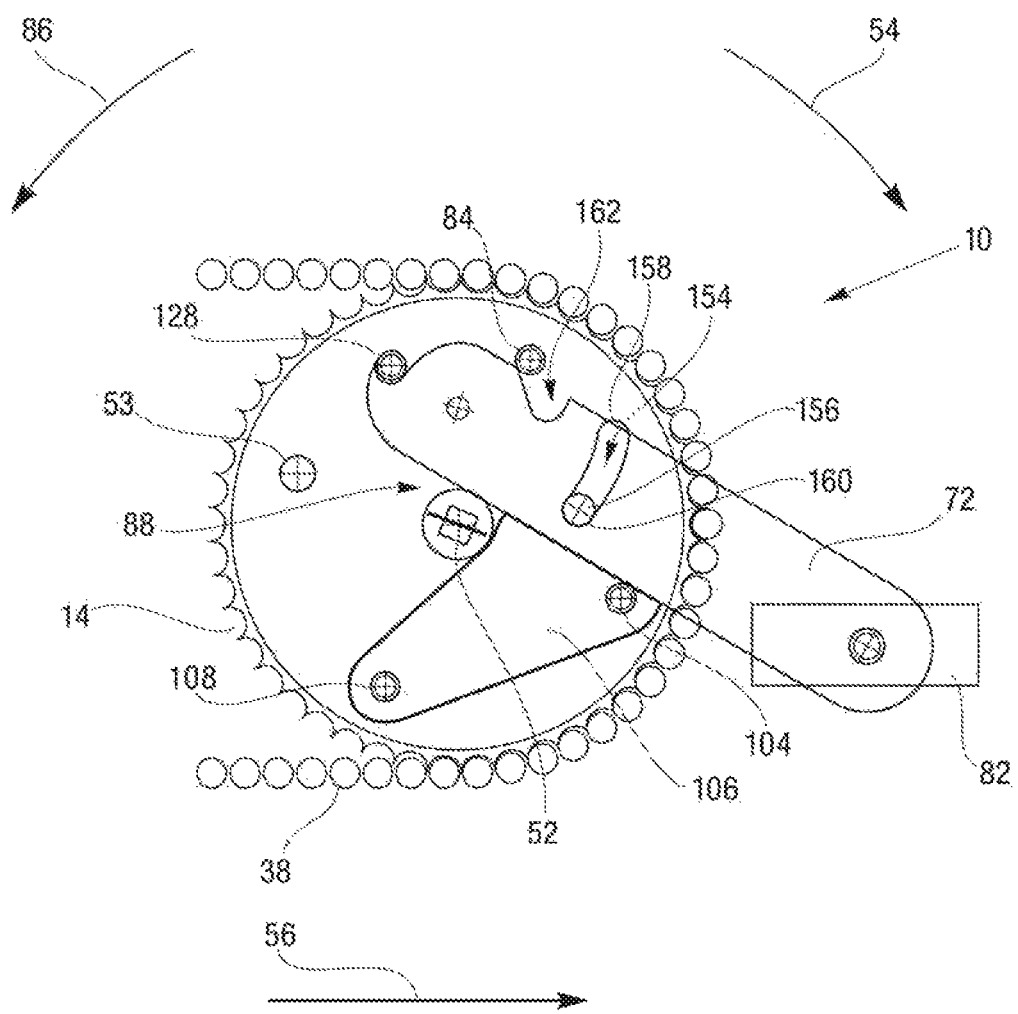
FIG. 5A shows the FIG. 4 leverage plate with the pedal moved from the about one o'clock position to an about four o'clock position away from the plate throughbore, and shows the shock absorber flexible material fully compressed and extending between a drive axle within the plate throughbore and a first clockwise stop post.

Operation of the arcuate guide slots 150A, 150B, 150C, and 150D the corresponding guide pins 152A, 152B, 152C and 152D within the slots is best seen in FIGS. 3, 4 and 5A with respect to one arcuate guide slot 154 and one guide pin 156. As shown in FIGS. 3, 4 and 5A, the arcuate guide slot 154 is defined in the leverage plate 10 and the guide pin 156 extends from the pedal arm 72 into the arcuate guide slot 154. An outer edge 158 of the arcuate guide slot 154 is closer to the perimeter edge 70 of the leverage plate 10 than an inner edge 160 of the arcuate guide slot 154. The arcuate guide slot 154 and the guide pin 156 are configured so that, whenever the pedal arm 72 is adjacent the counterclockwise stop post 84 (as shown in FIG. 3), the guide pin 156 is adjacent the outer edge 158 of the arcuate guide slot 154. Additionally, whenever the pedal arm 72 is adjacent the drive axle 52, the guide pin 156 is adjacent the inner edge 160 of the arcuate guide slot 154 (as shown in FIG. 5A). Therefore, each guide pin 152A, 152B, 152C and 152D and each arcuate guide slot 150A, 150B, 150C, and 150D cooperate to add support to stopping of movement of the pedal arms 72, 72', 72" in a counterclockwise direction 86 beyond the counterclockwise stop post 84 and the outer edge 158 of the guide pin slot 154. Additionally, each guide pin 152A, 152B, 152C and 152D and each arcuate guide slot 150A, 150B, 150C, and 150D cooperate to add support to stopping of movement of the pedal arm 72, 72', 72" in a clockwise direction beyond the drive axle 52, 52' the first clockwise stop post 104, and the inner edge 160 of the guide pin slot 154.

As shown in FIGS. 2-9, the outward side of the pedal arm 80 defines a post-recess 162 dimensioned to receive and secure the counterclockwise stop post 84 against movement toward and away from the outer end 76 of the pedal arm 72.

FIGS. 2-9 show relative positioning of the pedal 82 to the drive axle 52 and the flexible material shock absorber 106. In particular, FIG. 2 shows the leverage plate 10 with its pedal 82 at an about twelve o'clock position above the pedal arm attachment post 68. FIG. 3 shows the leverage plate 10 with the pedal 82 moved from the about twelve o'clock position above the pedal arm attachment 68 post to about a twelve o'clock position above the plate throughbore 64, and also shows the flexible material shock absorber 106 extending from the shock absorber anchor post 108 to contact the inner side 78 of the pedal arm 52. FIG. 4 shows the leverage plate 10 with the pedal 82 moved from the twelve o'clock position above the plate throughbore 64 to an about one o'clock position above the plate throughbore 64, and shows the flexible material shock absorber 106 partially compressed. FIG. 5A shows the leverage plate 10 with the pedal 82 moved from the about one o'clock position of FIG. 4 to an about four o'clock position away from the plate throughbore 64, and shows the flexible material shock absorber 106 fully compressed and extending between the drive axle 52 within the plate throughbore 64 and the first clockwise stop post 104.

Figure 5B:
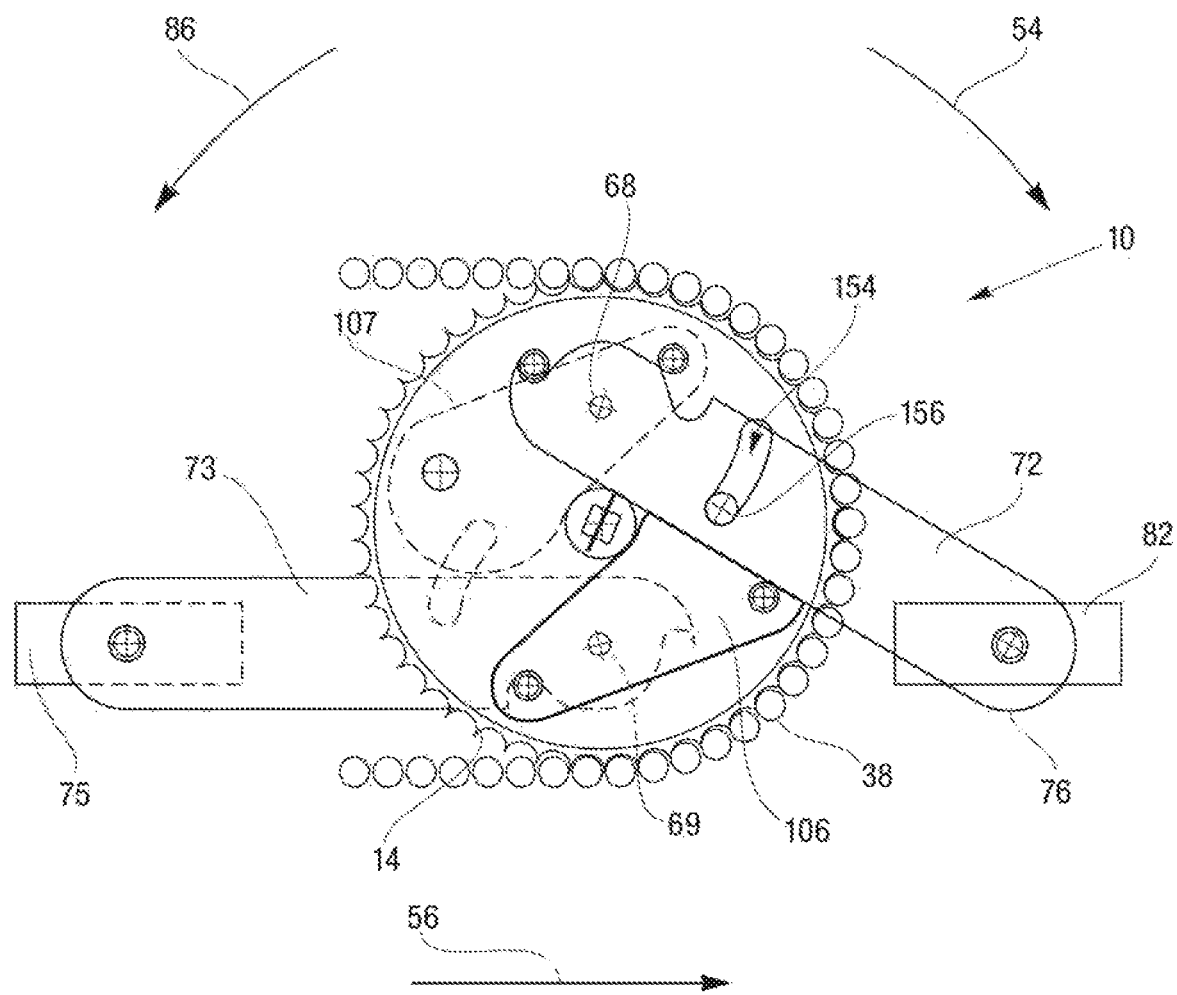
FIG. 5B shows the FIG. 5A leverage plate and includes in partially hatched lines a second leverage plate showing a second shock absorber of flexible material applying a rebound force to move a second pedal arm of the second leverage plate in a counterclockwise direction as a second pedal moves from an about a nine o'clock position away from the plate throughbore toward the about a twelve o'clock position above a second pedal arm attachment post.

FIG. 5B includes the leverage plate 10 of FIG. 5A, but shows in partially hatched lines an opposed pedal arm 73 and pedal 75 secured thereto, wherein the FIG. 5B opposed pedal arm 73 is secured to a second leverage plate (not shown in FIG. 5B, but shown at reference numeral 94" in FIG. 12, and at reference numeral 92 regarding a "non-gear side leverage plate 92" in FIG. 13, and described below). FIG. 5B also shows an opposed flexible material shock absorber 107 in hatched lines. FIG. 5B emphasizes the cooperative relationships of the two opposed pedal arms 72, 73 being in 180 degree opposed relationship because the leverage plates 10, 92" may be retrofit to virtually any bicycle and adjusted to function as illustrated in FIG. 5B.

Figure 6:
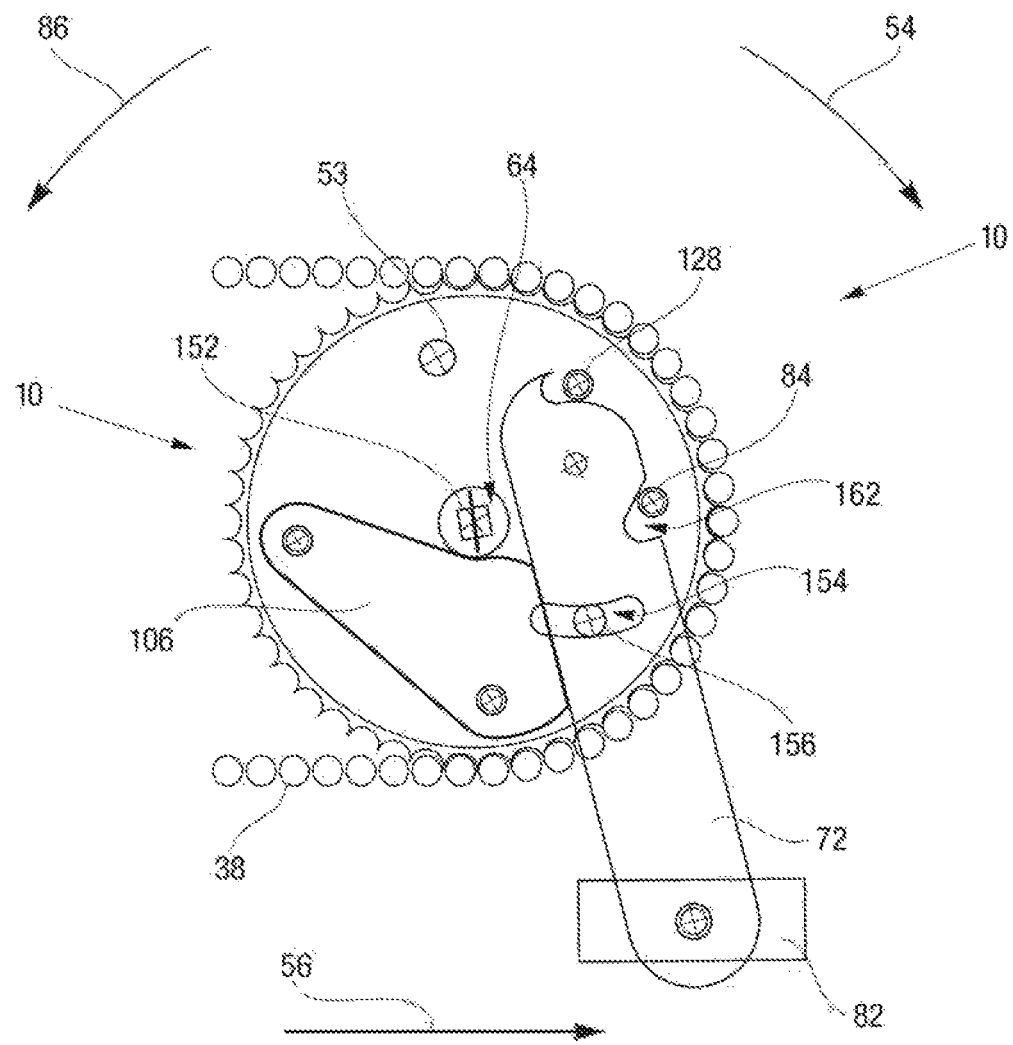
FIG. 6 shows the FIG. 5A leverage plate with the pedal moved to about a five o'clock position away from the plate throughbore and shows the shock absorber flexible material partially decompressed and exerting a rebound force upon the pedal arm.
Figure 8:
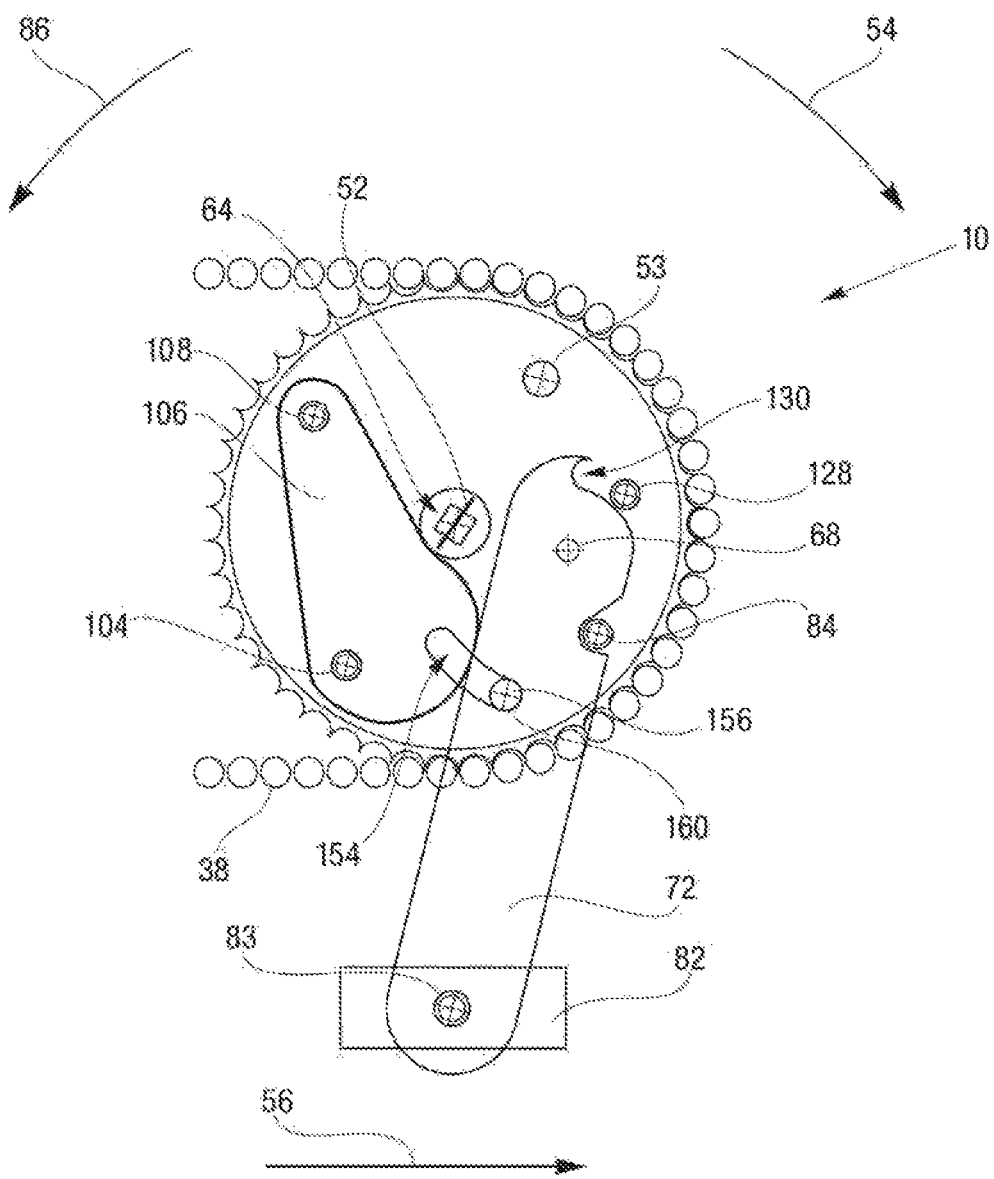
FIG. 8 shows the FIG. 7 leverage plate with the pedal moved to an about six o'clock position below the plate throughbore.
Figure 9:
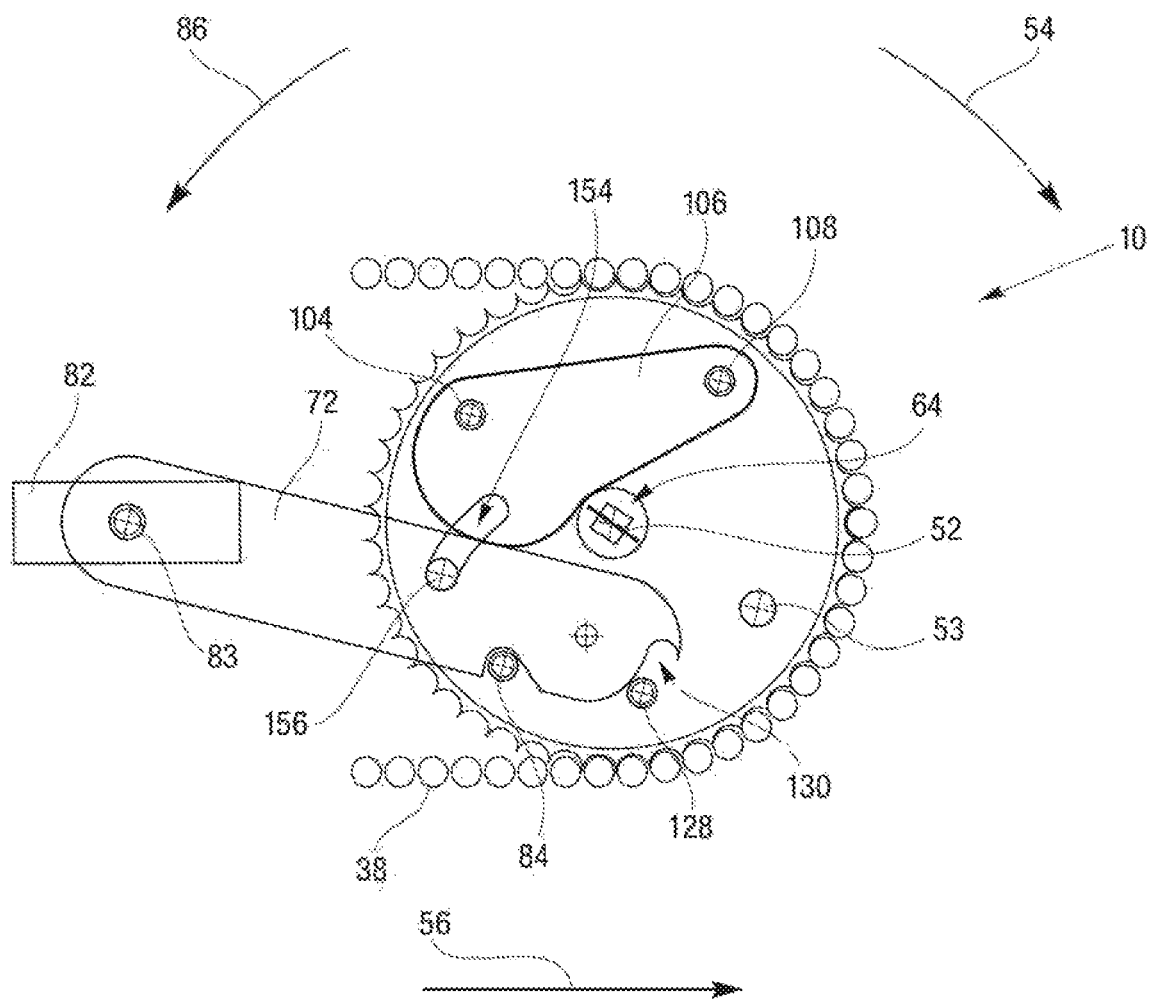
FIG. 9 shows the FIG. 8 leverage plate with the pedal moved to an about nine o'clock position away from the plate throughbore.

FIG. 6 shows the leverage plate 10 with the pedal 82 moved to about a five o'clock position away from the plate throughbore 64 and shows the flexible material shock absorber 106 partially decompressed and exerting a rebound force upon the pedal arm 72. FIG. 7 shows the leverage plate 10 with the pedal 82 moved to an about six o'clock position below the pedal arm attachment post 68 and shows the flexible material shock absorber 106 fully decompressed and continuing to exert a rebound force to keep the pedal arm 72 adjacent the counterclockwise stop post 84. FIG. 8 shows the leverage plate 10 with the pedal 82 moved to an about six o'clock position below the plate throughbore 64. FIG. 9 shows the leverage plate 10 with the pedal 82 moved to an about nine o'clock position away from the plate throughbore 64. The above described sequence of FIGS. 2-9 serve to emphasize that use of two described leverage plates 10, 92 and the associated components described hereinabove, when retrofit to virtually any existing bicycle, operate smoothly without disruption to a comfortable revolving motion. More importantly, use of the leverage plates 10, 92 dramatically enhances the motive power delivered to the bicycle main gear sprocket 14 by transforming the pedal arms 72, 73 into first-class levers. This provides a substantial mechanical advantage for a bicyclist (not shown) using the bicycle 16 with the leverage plates 10, 92 of the present disclosure.

As recited above, for purposes herein, a "first-class lever" is defined to mean a lever, such as the pedal arm 72 having a fulcrum, such as the drive axle 52 in the middle of the lever 72. An effort or force is applied to one side of the lever 72, such as the pedal 82 on the outer end of the pedal arm lever 72, which transfers the effort or force to the drive-axle fulcrum 52. A resulting resistance or load, such as rotation of the leverage plate 10 from the pedal arm attachment post 68 and around the plate throughbore 64, is applied to the opposed side of the drive-axle fulcrum 52. The above described pedal arm 72, drive axle 52, and pedal arm attachment post 68 is therefore a first-class lever. An amount of mechanical advantage achieved by a first-class lever can be calculated as a ratio of input force to output force including ratios of distances from the fulcrum to where the input and output forces are applied to the lever, as is well known.

By integrating the above described components into the pair of leverage plates 46, 92 (shown in FIG. 13) that can be readily retrofit, or just temporarily fit, to a standard bicycle, the present disclosure provides and extraordinary assistance to use of a bicycle in steep terrain, or for bicyclists (not shown) that may need a substantial mechanical advantage to utilize the bicycle 16 in ordinary terrain.

While the present disclosure has been presented above with respect to the described and illustrated embodiments of leverage plates 10, 46, 92 for transforming bicycle pedal arms 72, 72', 72" into first-class levers for propelling the bicycle 16, it is to be understood that the disclosure is not to be limited to those alternatives and described embodiments. Accordingly, reference should be made primarily to the following claims rather than the forgoing description to determine the scope of the disclosure. Again, for purposes herein, the word "about" is to mean plus or minus ten percent.

What is claimed is:

1. A leverage plate for transforming a pedal arm of a bicycle into a first-class lever, the leverage plate comprising:
   a. an outer planar surface and an opposed inner planar surface defining a plate throughbore passing through the outer and inner surfaces and dimensioned so that a drive axle of the bicycle passes through the plate throughbore and extends beyond the outer planar surface of the leverage plate, the plate throughbore being secured to the drive axle of the bicycle so that whenever the leverage plate rotates the drive axle also rotates;
   b. a pedal arm attachment post secured to and extending from the outer planar surface of the leverage plate, the pedal arm attachment post being positioned between the plate throughbore and a perimeter edge of the leverage plate;
   c. a counterclockwise stop post secured to and extending away from the leverage plate, the counterclockwise stop post being positioned on the leverage plate closer to the perimeter edge of the leverage plate than the pedal arm attachment post;
   d. a pedal arm having an inner end secured to the pedal arm attachment post and an outer end secured to a pedal, the pedal arm being positioned between the counterclockwise stop post and the drive axle, so that the counterclockwise stop post is positioned to stop rotation of the pedal arm about the pedal arm attachment post in a counterclockwise direction beyond the counterclockwise stop post,
   e. the pedal arm attachment post, the counterclockwise stop post, the pedal arm and the drive axle being cooperatively configured so that the pedal arm is secured to pivot about the pedal arm attachment post between the counterclockwise stop post and the drive axle passing through the plate throughbore, and so that, whenever the pedal moves from about a twelve o'clock position above the pedal arm attachment post to about a twelve o'clock position above the plate throughbore, the pedal arm moves from adjacent the counterclockwise stop post in a clockwise direction to adjacent the drive axle extending from the plate throughbore, wherein movement of the pedal arm in a clockwise direction moves the bicycle in a forward desired direction of travel, and wherein "above" is a direction opposed to a direction of a pull of gravity.

2. The leverage plate of claim 1, further comprising a protective plate that overlies and is secured to the outer planar surface of the leverage plate, and wherein the pedal arm is secured between the protective plate and the outer planar surface of the leverage plate.

3. The leverage plate of claim 2, further comprising an interface plate secured to the inner planar surface of the leverage plate, and wherein the interface plate defines bolt holes and an interface throughbore configured to secure the interface plate to the inner planar surface of the leverage plate so that the interface throughbore overlies the plate throughbore, to secure the interface plate to a main gear sprocket of the bicycle, and so that an end of the drive axle passes through the interface throughbore and into the adjacent plate throughbore.

4. The leverage plate of claim 2, wherein the leverage and the protective plate define an arcuate guide slot and the pedal arm includes a guide pin extending away from opposed pedal arm surfaces into the arcuate guide slots, wherein an outer edge of each of the arcuate guide slots is closer to the perimeter edge of the leverage plate than an inner edge of each of the arcuate guide slots, and wherein the arcuate guide slots and the guide pins are configured so that, whenever the pedal arm is adjacent the counterclockwise stop post the guide pin is adjacent the outer edge of the arcuate guide slot, and whenever the pedal arm is adjacent the drive axle the guide pin is adjacent the inner edge of the arcuate guide slot.

5. The leverage plate of claim 1, wherein the leverage plate further comprises a shock absorber extending between an inward side of the pedal arm and a first clockwise stop post that extends away from the leverage plate in a direction parallel to the pedal arm attachment post and that is positioned on the leverage plate between the drive axle and the perimeter edge of the leverage plate so that whenever the inward side of the pedal arm contacts the drive axle, the inward side of the pedal arm also contacts the first clockwise stop post to stop the pedal arm from rotating beyond the first clockwise stop post in a clockwise direction.

6. The leverage plate of claim 5, wherein the shock absorber further comprises flexible material that is positioned adjacent the inward side of the pedal arm, that is also positioned around the first clockwise stop post, and that is also positioned around a shock absorber anchor post that is secured to and that extends away from the leverage plate in a direction parallel to the pedal arm attachment post and that is positioned on the leverage plate between a line passing through the drive axle and the first clockwise stop post and at a position on the leverage plate that is a predetermined distance in a clockwise direction away from the line passing through the drive axle and the first clockwise post.

7. The leverage plate of claim 6, wherein the flexible material is about a one-half inch thick layer of rubber matt extending from adjacent the inward edge of the pedal arm to the shock absorber anchor post whenever the pedal arm is in about the twelve o'clock position above the pedal arm attachment post.

8. The leverage plate of claim 5, wherein the shock absorber further comprises a mechanical shock absorber extending between the inward side of the pedal arm and a shock absorber anchor post that is secured to and that extends away from the leverage plate in a direction parallel to the pedal arm attachment post and that is positioned on the leverage plate between a line passing through the drive axle and the first clockwise stop post and a position on the leverage plate that is a predetermined distance in a clockwise direction away from the line passing through the drive axle and the first clockwise stop post.

9. The leverage plate of claim 5, further comprising a second clockwise stop post that extends away from the leverage plate in a direction parallel to the pedal arm attachment post and that is positioned on the leverage plate between the drive axle and the perimeter edge of the leverage plate so that whenever the inward side of the pedal arm contacts the drive axle and the first clockwise stop post, a post-catch defined at a lower end of the pedal arm contacts the second clockwise stop post so that the second clockwise stop post supports the drive axle and the first clockwise stop post in preventing the pedal arm from moving in a clockwise direction beyond the first and second clockwise stop posts.

10. The leverage plate of claim 1, wherein the outward side of the pedal arm defines a post-recess dimensioned to receive and secure the counterclockwise stop post against movement toward and away from the outer end of the pedal arm.

11. A bicycle and a leverage plate for transforming a bicycle pedal arm into a first-class lever for propelling the bicycle, wherein the bicycle includes a frame, a steering mechanism attached to the frame, a seat attached to the frame for seating a rider, a front wheel rotatably secured to the frame and to the steering mechanism on a front end of the frame, a drive wheel rotatably secured to a rear end of the frame, the drive wheel having a drive gear sprocket for rotating the drive wheel as a driving wheel, a main gear sprocket secured to a gear side of the frame about midway between the front and drive wheels, and a drive-transmitting endless-loop chain secured between the main gear sprocket and the drive gear sprocket so that a revolving motion of the main gear sprocket in a clockwise direction around a view-directional axis, wherein the view-directional axis is aligned and oriented in a view-direction that first passes through the main gear sprocket, then passes through the gear side of the frame, and then passes through and away from a non-gear side of the frame, revolves the drive gear sprocket and the drive wheel to move the bicycle in a desired forward moving direction, a pair of leverage plates secured to opposed ends of a drive axle passing through the main gear sprocket and the frame, wherein each leverage plate comprises:

a. an outer planar surface and an opposed frame-side planar surface, the planar surfaces defining a plate throughbore passing through the opposed surfaces of the leverage plate, wherein the drive axle is dimensioned to be secured to the plate throughbore and to pass through an axle throughbore of the main gear sprocket;

b. a pedal arm attachment post secured to and protruding from the outer planar surface of the leverage plate in a direction away from the bicycle frame, the pedal arm attachment post being positioned between the plate throughbore and a perimeter edge of the leverage plate;

c. a pedal arm having an inner end and an opposed outer end, the inner end being secured to the pedal arm attachment post so that the outer end of the pedal arm extends in a direction about parallel to the outer planar surface of the leverage plate and extends beyond the perimeter edge of the leverage plate, the pedal arm attachment post securing the pedal arm against removal from the attachment post, the pedal arm also including an inward side and an opposed outward side, wherein the inward side is closer to the plate throughbore than the outward side of the pedal arm;

d. a pedal rotatably secured to the outer end of the pedal arm so that rotation of the pedal through a 360 degree rotation moves the pedal arm, the leverage plate, the drive axle and the main gear sprocket through a 360 degree rotation around the plate throughbore;

e. a counterclockwise stop post secured to and extending away from the leverage plate in a direction parallel to the pedal arm attachment post and positioned on the leverage plate closer to the perimeter edge of the leverage plate than the pedal arm attachment post, and also positioned closer to the outer end of the pedal arm than the pedal arm attachment post to thereby stop rotation of the pedal arm around the pedal arm attachment post in a counterclockwise direction beyond the counterclockwise stop post; and, f. the pedal arm attachment post, the counterclockwise stop post and the pedal arm being cooperatively configured so that the pedal arm is secured to pivot about the pedal arm attachment post between the counterclockwise stop post and the drive axle passing through the plate throughbore, and so that, whenever the pedal moves from about a twelve o'clock position above the pedal arm attachment post to about a twelve o'clock position above the plate throughbore, wherein "above" is a direction opposed to a direction of a pull of gravity, the pedal arm moves from adjacent the counterclockwise stop post to adjacent the drive axle extending from the plate throughbore to transform the drive axle into a fulcrum of a pedal arm first-class lever, thereby providing a mechanical advantage to any force being applied in the direction of the pull of gravity to the pedal, to the pedal arm, to the drive-axle fulcrum, and to the pedal attachment post, to thereby facilitate rotation of the leverage plate, the drive axle and the main gear sprocket while the pedal rotates in the clockwise direction from the about twelve o'clock position above the plate throughbore to about a six o'clock position below the plate throughbore.

12. The bicycle of claim 11, wherein the pair of leverage plates secured to opposed ends of the drive axle further comprise a gear-side leverage plate and a non-gear-side leverage plate, wherein the gear-side leverage plate includes a gear-side protective plate that overlies and is secured to the outer planar surface of the gear-side leverage plate, wherein the non-gear-side leverage plate includes a non-gear-side protective plate that overlies and is secured to the outer planar surface of the non-gear-side leverage plate, and wherein pedal arms of the leverage plates are secured between the protective plates and the leverage plates.

13. The bicycle of claim 12, wherein the gear-side leverage plate includes an interface plate secured to the frame-side planar surface of the gear-side leverage plate, and wherein the interface plate includes bolt-holes and an interface throughbore configured to secure the interface plate to the frame-side planar surface of the gear-side leverage plate, and to the main gear sprocket, while the drive axle passes through the interface throughbore.

14. The bicycle of claim 12, wherein each of the leverage and protective plates define an arcuate guide slot and each of a first pedal arm and a second pedal arm include a guide pin extending away from opposed pedal arm surfaces into the arcuate guide slots, wherein an outer edge of each of the arcuate guide slots is closer to the perimeter edges of the leverage plates than an inner edge of each of the arcuate guide slots, and wherein the arcuate guide slots and the guide pins are configured so that, whenever either the first or second pedal arm is adjacent the counterclockwise stop post, the guide pin is adjacent the outer edge of the arcuate guide slot, and whenever the pedal arm is adjacent the drive axle, the guide pin is adjacent the inner edge of the arcuate guide slot, so that the guide pin and guide slot cooperate to support stopping of movement of the pedal arm in a counterclockwise direction beyond the counterclockwise stop post and the outer edge of the guide pin slot, and so that the guide pin and guide slot cooperate to support stopping of movement of the pedal arm in a clockwise direction beyond the drive axle, the first clockwise stop post, and the inner edge of the guide pin slot.

15. The bicycle of claim 11, wherein each of the pair of leverage plates secured to opposed ends of the drive axle further comprise a shock absorber extending between an inward side of the pedal arm and a first clockwise stop post that extends away from the leverage plate in a direction parallel to the pedal arm attachment post and that is positioned on the leverage plate between the drive axle and the perimeter edge of the leverage plate so that whenever the inward side of the pedal arm contacts the drive axle, the inward side of the pedal arm also contacts the first clockwise stop post to stop the pedal arm from rotating beyond the first clockwise stop post in a clockwise direction, the shock absorber adding resistance force to movement of the pedal arm from adjacent the counterclockwise stop post to being adjacent the drive axle and the first clockwise stop post, and the shock absorber also adding rebound force to move the pedal arm in a counterclockwise direction from adjacent the drive axle to adjacent the counterclockwise stop post as the pedal arm rotates in a clockwise direction from about a six o'clock position below the plate throughbore to about a twelve o'clock position above the plate arm attachment post.

16. The bicycle of claim 15, wherein the shock absorber further comprises flexible material that is positioned adjacent the inward side of the pedal arm, that is also positioned around the first clockwise stop post, and that is also positioned around a shock absorber anchor post that is secured to and that extends away from the leverage plate in a direction parallel to the pedal arm attachment post and that is positioned on the leverage plate between a line passing through the drive axle and the first clockwise stop post and at a position on the leverage plate that is a predetermined distance in a clockwise direction away from the line passing through the drive axle and the first clockwise stop post.

17. The bicycle of claim 16, wherein the flexible material is about a one-half inch thick layer of rubber matt extending from adjacent the inward edge of the pedal arm to the shock absorber anchor post whenever the pedal arm is in about the twelve o'clock position above the pedal arm attachment post.

18. The bicycle of claim 15, wherein the shock absorber further comprises a mechanical shock absorber extending between the inward side of the pedal arm and a shock absorber anchor post that is secured to and that extends away from the leverage plate in a direction parallel to the pedal arm attachment post and that is positioned on the leverage plate between a line passing through the drive axle and the first clockwise stop post and a position on the leverage plate that is a predetermined distance in a clockwise direction away from the line passing through the drive axle and the first clockwise stop post.

19. The bicycle of claim 15, further comprising a second clockwise stop post that extends away from the leverage plate in a direction parallel to the pedal arm attachment post and that is positioned on the leverage plate between the drive axle and the perimeter edge of the leverage plate so that whenever the inward side of the pedal arm contacts the drive axle and the first clockwise stop post, a post-catch defined at a lower end of the pedal arm contacts the second clockwise stop post so that the second clockwise stop post supports the drive axle and the first clockwise stop post in preventing the pedal arm from moving in a clockwise direction beyond the first and second clockwise stop posts.

20. The bicycle of claim 11, wherein the outward side of the pedal arm defines a post-recess dimensioned to receive and secure the counterclockwise stop post against movement toward and away from the outer end of the pedal arm.

\* \* \* \* \*